March 22, 1955  F. W. KENNEDY  2,704,586
SPAR ARM SUPPORTING GAIN
Filed April 14, 1949
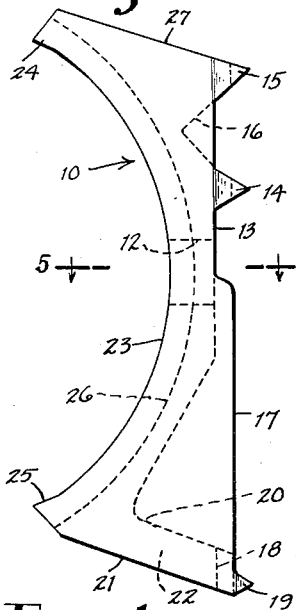
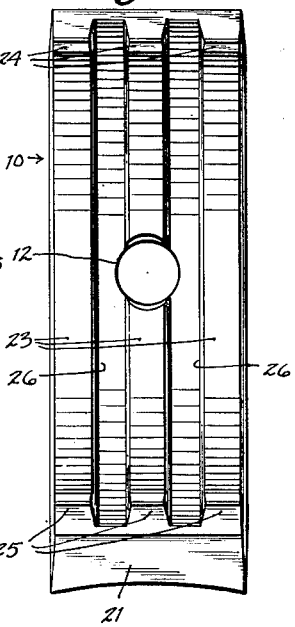
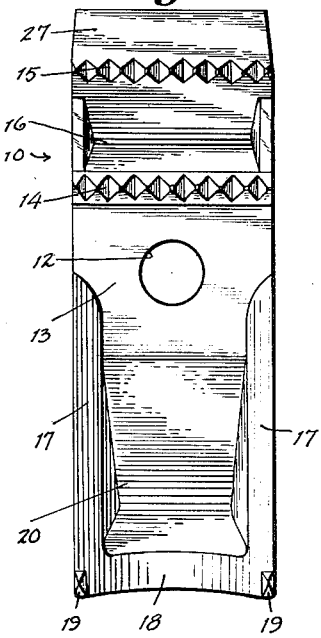
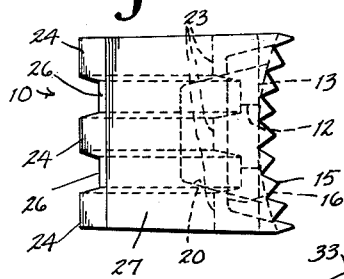
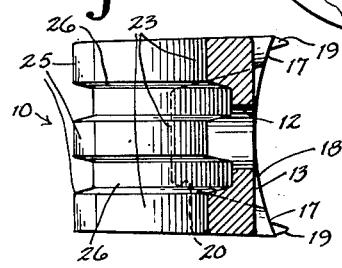
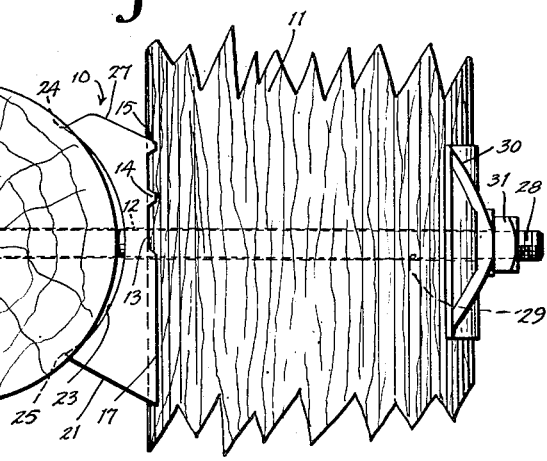
Inventor
FREEMAN W. KENNEDY.
By
Attorney

United States Patent Office 2,704,586
Patented Mar. 22, 1955

2,704,586

SPAR ARM SUPPORTING GAIN

Freeman W. Kennedy, Montclair, N. J., assignor to Malleable Iron Fittings Company, Branford, Conn., a corporation of Connecticut Application April 14, 1949, Serial No. 87,392

2 Claims. (Cl. 189—33)

The present invention relates to a spar arm supporting gain for attachment to transmission line poles, and has for its principal object the provision of a gain of this character especially adapted to effectually support a spar arm of circular cross-section and having a small degree of taper between its ends, that is a spar arm consisting of a length of timber from which the bark has been removed but is otherwise in its natural state, as distinguished from a cross arm of rectangular cross-section formed from a length of timber having slabs removed from its four sides. The spar arm of circular cross-section has a number of advantages over the trimmed rectangular cross-section cross arm, aside from the fact that the expense of trimming and handling in the mill is eliminated. The circular cross-section spar arm has greater inherent strength, has less tendency to split, and when fastened by bolts extending through its diametric center its maximum load supporting potentialities may be realized.

The conventional type of cross arm gain heretofore in use has been designed especially for the support of a trimmed rectangular cross-section spar arm, being provided with a step in which one corner of the cross arm is seated, a through-bolt for attachment to the vertical pole being provided above the step for engagement through a transverse hole drilled approximately through the center line of the cross arm, the distance between the step and the through-bolt being predetermined for a particular dimension of cross arm. In using this type of gain for support of a circular cross-section tapered spar arm it is impossible, because of the variation in the diameter of the spar arm, to uniformly fasten the spar arm by through-bolts extending through its diametric center, and furthermore the step support does not provide sufficient bearing engagement with the surface of the spar arm to effectually withstand strains upon it. Also it is impractical to drill the holes to receive the through-bolts before its actual installation, as the position of these holes will vary, depending upon the particular diameter of the spar arm at the point where it is supported upon the gain.

It is proposed in the invention to provide a spar arm gain especially adapted for the support of a spar arm of circular cross-section and of varying diameter within predetermined limits, and particularly to provide a gain which will automatically center the spar arm with respect to the through-bolt so that the latter may extend through the diametric center of the spar arm. Thus the full strength of the arm may be realized, and the through bolt holes may be drilled prior to delivery of the arm at the installation site.

It is further proposed to provide bearing points upon the gain for engagement with the surface of the spar arm at equally spaced points above and below the through bolts, the surface of the gain between these bearing points being normally out of contact with the surface of the spar arm, so that the through-bolt may be substantially tightened to firmly engage the spar arm with the gain irrespective of variations in its diameter, within predetermined maximum and minimum diameter limits, while still maintaining contact with the bearing points.

A further object is to provide a spar arm gain having gripping means for engaging the vertical pole to effectually resist turning movement, and also having bearing surfaces for firmly supporting the spar arm and its carried load against the vertical pole surface.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a side elevation of a spar arm gain, according to the illustrated exemplary embodiment of the invention.

Fig. 2 is a front elevation.

Fig. 3 is a rear elevation.

Fig. 4 is a top plan view.

Fig. 5 is a horizontal sectional view, taken along the line 5—5 of Fig. 1.

Fig. 6 is a side elevation showing the spar arm gain in its assembled relation with a vertical pole and horizontal spar arm.

Similar reference characters indicated corresponding parts throughout the several figures of the drawings.

Referring to the drawings, the spar arm gain, according to the illustrated exemplary embodiment of the invention, comprises a one-piece body, indicated generally as 10, and preferably in the form of a malleable iron casing, having its rearward face generally curved to approximately fit the vertical pole 11, and provided with formations for gripping and bearing engagement with the pole, as will presently more fully appear. The body 10 is provided at its approximate center point with a horizontal hole 12 for receiving the through-bolt, hereinafter more fully referred to, the rearward surface, immediately surrounding the hole and extending to each of the side edges, being flat, as at 13. Upon the rear face in vertically spaced relation above the hole 12 there are provided two vertically spaced transversely curved rows of teeth 14 and 15 extending between each of the side edges, the curvature of these teeth corresponding approximately to the curvature of the pole 11, and the teeth adapted to bite into the pole upon tightening of the gain thereon, to thus resist turning movement of the gain about the axis of the through-bolt. Between the rows of teeth 14 and 15 the rear face is provided with a recess 16 for the purpose of reducing the weight of the gain. Above the hole 12 the rear face is provided with a recess 16 for the purpose of reducing the weight of the gain. Below the hole 12 the rear face is provided along its vertical edges with vertically disposed bearing surfaces 17—17, and along its lower edge with a transverse bearing surface 18, these bearing surfaces being transversely curved to approximately correspond to the curvature of the vertical pole 11, and being continuously connected with each other so that they present a relatively large bearing surface area for engagement with the pole. At the lower corners of the rear face there are provided spur formations 19—19 adapted to dig into the pole to assist in preventing turning movement about the through-bolt, and to increase resistance to downward drag of the whole spar arm construction. Between the bearing surfaces 17—17 the rear face is provided with a recess 20 for the purpose of reducing the weight of the gain, the lower surface of this recess being parallel to the lower upwardly and forwardly inclined surface 21 of the gain to provide a relatively thick upwardly inclined wall 22 at the lower end of the gain, this wall constituting a cantilever strut support for the spar arm, as will presently more fully appear.

The forward face of the gain is concavely curved about a horizontal axis coincident and at right angles to the extended horizontal axis of the through-bolt receiving hole 12 to provide a cradle recess 23, which terminates at its upper and lower ends in slightly projected spike formations 24 and 25, these latter being disposed in vertical line with each other and at equally spaced points from the radius center of the cradle recess. The cradle recess is provided with a pair of grooves 26—26 parallel to its side edges, for the purpose of reducing the weight of metal in the gain, these grooves also dividing the spike formations 24 and 25 into three parts for facilitating their gripping engagement with the spar arms, as will presently more fully appear. The upper end surface 27 of the gain is inclined downwardly from the spike formation 24 to the upper row of teeth 15.

The radius of the surface 23 is predetermined with respect to a predetermined range of diameters of the spar arm to be engaged therewith, being slightly smaller than the minimum radius of the spar arm, so that when the spar arm is engaged therewith, as shown in Fig. 6, it will be engaged by the spike formations 24 and 25 at equally spaced points above and below the through-bolt and its surface intermediate the spike formations will be out of contact with the cradle recess 23. Thus, the radius of the cradle recess 23 may be calculated for engagement with a tapered spar arm having predetermined maximum and minimum diameters, which for practical purposes may have a range of variation of about 2 inches. In practice it is proposed to manufacture the gains in several sizes to accommodate several ranges of sizes of spar arms. For example, in one size gain the radius of the cradle recess may be 3⅛ inches, for use with spar arms having a diameter range from 6½ inches to 8½ inches, in another size gain the radius of the cradle recess may be 4⅛ inches, for use with spar arms having a diameter range from 8½ inches to 10½ inches, and in a third size gain the radius of the cradle recess may be 5⅛ inches, for use with spar arms having a diameter range from 10½ inches to 12½ inches.

In operation, the gain is engaged with the vertical pole 11, as shown in Fig. 6, with a horizontal through-bolt 28 engaged through the hole 12 and through a hole 29 drilled in the pole, a curved washer 30 being engaged upon the end of the bolt at the opposed side of the pole from the gain and secured by a nut 31 screwed upon the bolt. A hole 32 is drilled through the diametric center of the spar arm 33 and is engaged by the projecting through-bolt, a curved washer 34 being engaged thereon against the surface of the spar arm opposed to the gain and secured by a nut 35 screwed upon the bolt, tightening of this nut forcing the spar arm against the spike formations 24 and 25 at points equally spaced above and below the through-bolt. In practice the nut may be tightened to the point where the spike formations bite firmly into the spar arm, the surface of the spar arm intermediate the spike formations, however, remaining out of contact with the cradle recess 23 by virtue of the fact that the minimum radius of the spar arm is greater than the radius of the cradle recess. Thus, irrespective of its diameter, the spar arm is automatically centered upon the gain. In the case of the tapered spar arm constituting the cross-piece of an H-frame, the two portions engaged by the gains provided upon the two uprights are centered so that the axis of the tapered spar arm is exactly horizontal, provided the holes 29 in the uprights are drilled an equal distance from the ground and the holes 33 in the spar arm are drilled through its diametric center. The H-frame usually consists of two vertical uprights and a single spar arm supported horizontally across the uprights near their upper ends, the spar arm projecting outwardly beyond each of the uprights, usually a distance equal to half of the distance between the uprights. Another arrangement may consist in providing spar arms and supporting gains at both sides of the vertical pole simply by providing a through-bolt of sufficient length to extend through the two spar arms.

I have illustrated and described a preferred and satisfactory embodiment of the invention, but it will be understood that changes may be made therein, within the spirit and scope thereof, as defined in the appended claims.

What is claimed is:

1. In a transmission line supporting structure wherein a horizontal substantially circular-cross-section spar arm is supported on a vertical substantially circular-cross-section pole by a horizontal through bolt extending diametrically through said pole and spar arm, and retaining means upon the ends of said bolt engaging the outer sides of said pole and spar arm adapted for tightening adjustment one toward the other to force said spar arm toward said pole, the improvement comprising a gain member for interpositional engagement with and between the inner adjacent opposed surfaces of said pole and spar arm, adapted to be placed under compression between said pole and spar arm through the compressive force applied through tightening of said retaining means, and comprising a pole-engaging rearward side and an arm-engaging forward side adapted for embedding engagement in said adjacent opposed surfaces of said pole and spar arm, there being a horizontal through-bolt-receiving hole extending from said rearward to said forward side, said rearward side being transversely concavely curved for substantial conforming engagement with said pole, said forward side having upper and lower spar-arm-engaging spike portions in vertical alignment and equally spaced above and below said through-bolt-receiving hole, the vertical distance between said spike portions being substantially less than the vertical diameter of said spar arm, whereby their points of engagement with said spar arm are substantially inwardly of the vertical diametric plane of said spar arm, said upper spike portion having a downwardly and rearwardly inclined lower surface, said lower spike portion having an upwardly and rearwardly inclined upper surface, and the intermediate forward surface between said spike portions being rearwardly recessed and out of contact with the spar arm upon at least partial penetration of said spike portions into said spar arm.

2. In a transmission line supporting structure wherein a horizontal substantially circular-cross-section spar arm is supported on a vertical substantially circular-cross-section pole by a horizontal through bolt extending diametrically through said pole and spar arm, and retaining means upon the ends of said bolt engaging the outer sides of said pole and spar arm adapted for tightening adjustment one toward the other to force said spar arm toward said pole, the improvement comprising a gain member for interpositional engagement with and between the inner adjacent opposed surfaces of said pole and spar arm, adapted to be placed under compression between said pole and spar arm through the compressive force applied through tightening of said retaining means, and comprising a pole-engaging rearward side and an arm-engaging forward side adapted for embedding engagement in said adjacent opposed surfaces of said pole and spar arm, there being a horizontal through-bolt-receiving hole extending from said rearward to said forward side, said rearward side being transversely concavely curved for substantial conforming engagement with said pole, said forward side having upper and lower spar-arm-engaging spike portions in vertical alignment and equally spaced above and below said through-bolt-receiving hole, the vertical distance between said spike portions being substantially less than the vertical diameter of said spar arm, whereby their points of engagement with said spar arm are substantially inwardly of the vertical diametric plane of said spar arm, said upper spike portion having a downwardly and rearwardly inclined lower surface, said lower spike portion having an upwardly and rearwardly inclined upper surface, the intermediate forward surface between said spike portions being rearwardly recessed and out of contact with the spar arm upon at least partial penetration of said spike portions into said spar arm, and the lower side of said gain member being inclined downwardly from said lower spike portion to said pole-engaging rearward side and constituting under compression a cantilever strut support for said spar arm.

References Cited in the file of this patent

UNITED STATES PATENTS

| | | |
|---|---|---|
| 900,545 | Humiston | Oct. 6, 1908 |
| 900,663 | Callane | Oct. 6, 1908 |
| 1,175,392 | White | Mar. 14, 1916 |
| 1,225,301 | Wolfe | May 8, 1917 |
| 1,808,196 | Williams | June 2, 1931 |
| 2,517,286 | Cooper | Aug. 1, 1950 |

FOREIGN PATENTS

| | | |
|---|---|---|
| 25,047 | Great Britain | Nov. 17, 1903 |